Feb. 12, 1957 L. GUTHMAN 2,780,853
CLASP
Filed Oct. 4, 1955
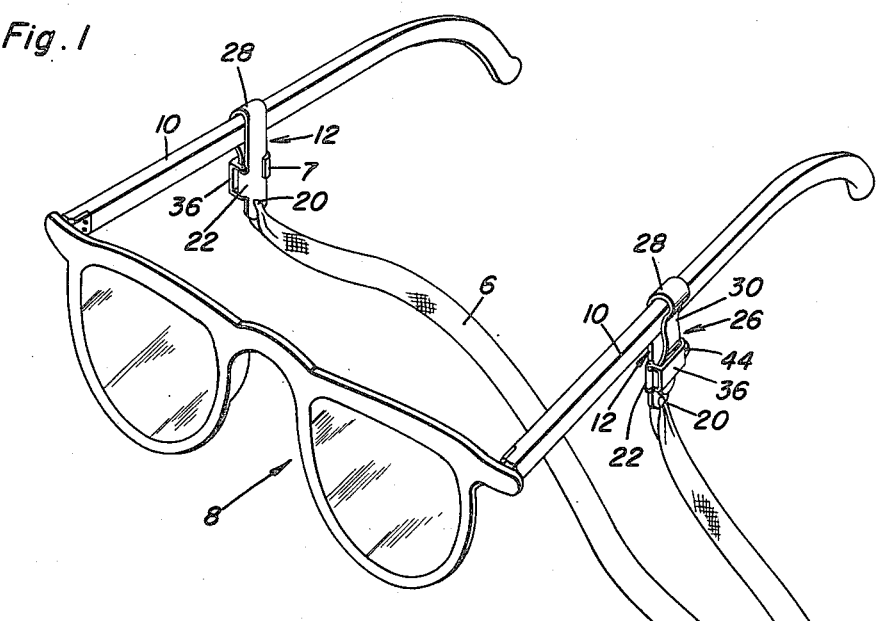
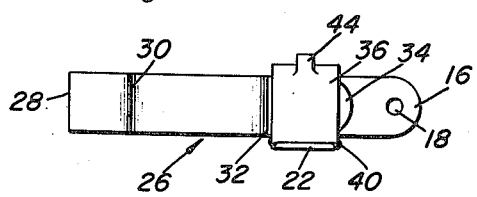
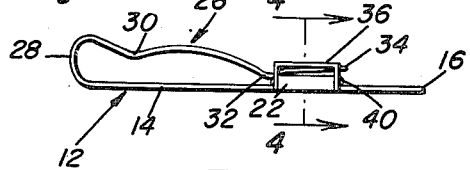
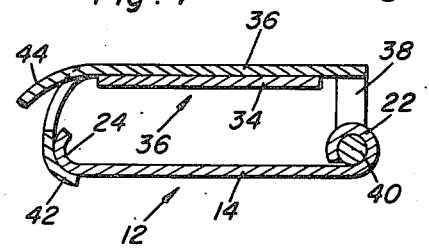
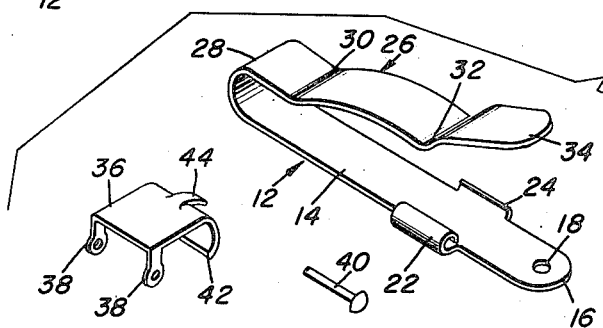
Lawrence Guthman
INVENTOR.
BY *Clarence A. O'Brien*
*and Harvey B. Jacobson*
Attorneys

United States Patent Office 2,780,853
Patented Feb. 12, 1957

2,780,853

CLASP

Lawrence Guthman, Lake Worth, Fla.

Application October 4, 1955, Serial No. 538,398

2 Claims. (Cl. 24—243)

The present invention relates to improved means, broadly speaking, for attaching the ends of a flexible element, for example, a chain, cord, ribbon, beads or the like, to the complemental temples of a pair of eyeglasses or spectacles in a now generally well known manner to partly encircle the neck of the wearer and to suspend the eyeglasses in a manner sometimes called a captive state where they are accessible for handy use.

As the general statement of the invention clearly reveals, it is common practice to employ a flexible element, such as a so-called captive ribbon, and to fasten the ends thereof to the temples of the eyeglasses for the purpose above stated. Take, for example, the patent issued to Eleanor E. Pendelton, under No. 2,648,255 of August 11, 1953. This is what may be called a typical example of a retaining and suspending device for spectacles. The object of the present invention is to improve upon the means which may be relied upon to connect the ends of the flexible element to the stated temples. Studied consideration of this problem, especially from the special standpoint of jewelers, has now brought to light the invention which is here to be disclosed and which is a jeweler's clasp of improved and reliable construction, one which may be expeditiously applied and removed and which is secure once it is in place.

Keeping in mind the state of development of the art having to do with sheet metal and equivalent clasps and catches, it will be obvious that it is another object of the invention to structurally, functionally and otherwise improve upon similarly constructed and performing clasps and, in doing so, to provide a construction in which manufacturers, jewelers, purchasers and others will find their respective requirements and needs not only carefully taken into account but effectively achieved.

To the end that the above objective may be accomplished, the clasp which is the exemplification of invention here is characterized by a pair of limbs joined at corresponding ends by way of a junctional bend, the other ends remote from said bend being free of connection with each other and such that they may be spread apart or pressed together as desired, one limb being linearly straight and substantially rigid, the other limb being comparatively resilient and having an indentation providing a friction detent adapted to clampingly bind when pressed against a part which is located between the first named ends of said limbs, and means clamping said free ends together.

Other objects, features and advantages will become more readily apparent from the following description and the accompanying sheet of illustrative drawings.

In the drawings, wherein like numerals are employed to designate like parts throughout the views:

Figure 1 is a perspective view of a pair of conventional spectacles with a "captive type" ribbon or band attached to clasps mounted on the temples and which are constructed in accordance with the present invention;

Figure 2 is a top plan view of one of the improved clasps;

Figure 3 is an edge elevation of the clasp seen in Figure 2;

Figure 4 is an exaggerated cross-section on the line 4—4 of Figure 3, looking in the direction of the arrows; and Figure 5 is an exploded perspective view in which the components or parts are individually and clearly shown.

As will be clear from the disclosure so far touched upon, the invention is, of course, not in the over-all combination seen in Figure 1. It is old in the art to employ ribbons and the like. Therefore, the "flexible" element, whether it be a chain, ribbon or the like, is denoted by the numeral 6. The eyeglasses or spectacles are denoted at 8 and the temples at 10. It is the clasps which constitute the essence of the invention here, and therefore, since both clasps are the same in construction, the description of one will suffice for both. Referring now to Figure 5, the clasp is characterized by sheet metal of a grade or character which can be hardened to create the desired rigid and resilient properties. The first limb is denoted by the numeral 12 and is substantially flat, linearly straight, and approximately rigid, as at 14. The tip or free end portion of this limb is denoted at 16 and has a hole 18 therein to which the cooperating end portion 20 of the aforementioned ribbon is fastened. Inwardly of this end portion and along one longitudinal edge, there is a hinge knuckle 22. On the opposite side, there is an upstanding flange or lip 24 which may be conviently referred to here as a fixed keeper. This keeper is opposite the hinge knuckle. The complemental second limb is denoted by the numeral 26, and this is joined by a convex or curvate bend 28, of a suitable springy nature, to the end of the limb 12. In other words, like or corresponding ends of the two limbs are joined by way of this springy bend. The limb 26 is also distinguished in that it is not only shorter than the limb 12 but is a resilient limb and is adapted to be either spread open or pressed to approximately a closed position in the manner shown in the drawings. There is a crease or transverse bend 30, and this is bent in such a manner that it provides an indentation forming what is conveniently referred to here as a friction detent, the same being adapted to bind against the coacting surface of the temple 10 in the manner shown in Figure 1. There is another transverse bend 32 and the free end portion 34 flares outwardly and forms a springy or resilient tang, and it is this tang which is movable into the space between the knuckle 22 and the keeper 24, as illustrated in the drawings. In order to maintain the limbs 12 and 26 clamped together, an appropriate clamping latch is provided, and this is a simple clip or equivalent plate element which may be suitably ornamented, and it is denoted by the numeral 36 and has depending apertured ears 38 hingedly mounted on the pintle or pin 40 passing through the knuckle 22 in an obvious manner. The opposite end portion of this plate is directed laterally to form a curvate lip 42, and this lip 42 constitutes a snap catch and is engageable releasably with the keeper 24. The struck out tongue 44 is merely a latch opening trip.

It will be evident that the indentation 30, an important clamping and pressure point, can be formed to occupy a position closer to or farther from the bend 28, in order to accommodate the particular part which is to be seated between the limbs 14 and 26 and in the crotch provided by the bend 28. This is thought to be within the sphere of the concept in order to accommodate objects, regardless of shape, that is, whether round, square, ovate, etc. By pressing the body end down under the lid-like latch 36, the distance between the catch 42 and the pressure point 30 may be reduced and will make the clasp applicable to objects smaller in outside circumference than the distance between the catch and said pressure point.

When the latch 36 is open (not detailed), the limb 26 spreads to the wide open position seen, for example, in Figure 5. This will provide sufficient space between the free end portions 16 and 34 to allow the legs or limbs to straddle over the temple or other part 10. Then, when the latch is snapped closed, as shown in the drawings, the ends 16 and 34 are brought together in close relation, and the closing action of 34 against 14 binds the detent 30 against 10 to bring about the desired clamping action.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A clasp comprising a pair of limbs joined at corresponding ends by way of a junctional bend, the other ends remote from said bend being free of connection with each other and such that they may be spread apart or pressed together as desired, one limb being linearly straight and substantially rigid, the other limb being comparatively resilient and having an indentation providing a friction detent adapted to clampingly bind when pressed against a part which is located between the first named ends of said limbs, the free end portion of said resilient limb being flared out and in a direction away from said rigid limb and thus providing a springy tang, a latch hingedly mounted on the free end portion of said rigid limb and saddled over and embracing the free end portion of said resilient limb, the free swingable end of said latch having a catch and said rigid limb having a keeper over which said catch is snapped and retained in the desired retaining position.

2. A clasp comprising a pair of limbs joined at corresponding ends by way of a junctional bend, the other ends remote from said bend being free of connection with each other and such that they may be spread apart or pressed together as desired, one limb being linearly straight and substantially rigid, the other limb being comparatively resilient and having an indentation providing a friction detent adapted to clampingly bind when pressed against a part which is located between the first named ends of said limbs, the free end portion of said resilient limb being directed and flared outwardly and in a direction away from the adjacent end portion of the rigid limb and defining a springy tang which may be sprung toward said rigid limb, a hinge knuckle carried by one longitudinal edge portion of said rigid limb, a lateral curved flange on the opposed longitudinal edge portion of said rigid limb and constituting a keeper, a latch comprising a plate having one end portion hingedly connected with said knuckle, said plate being adapted to swing transversely across said tang and the other end of said plate remote from said knuckle being provided with a curved lip constituting a catch, said catch being conformable with and releasably engageable with said keeper.

References Cited in the file of this patent

UNITED STATES PATENTS

| 501,392 | Wiedenmann | July 11, 1893 |
| 1,239,746 | Tobie | Sept. 11, 1917 |

FOREIGN PATENTS

| 591,321 | France | of 1925 |
| 1,503,080 | France | of 1954 |
| 713,575 | Great Britain | of 1954 |